U. WEDGE.
SLAG HEATED STEAM GENERATOR.
APPLICATION FILED JULY 16, 1914. RENEWED APR. 27, 1916.
1,267,022.
Patented May 21, 1918.
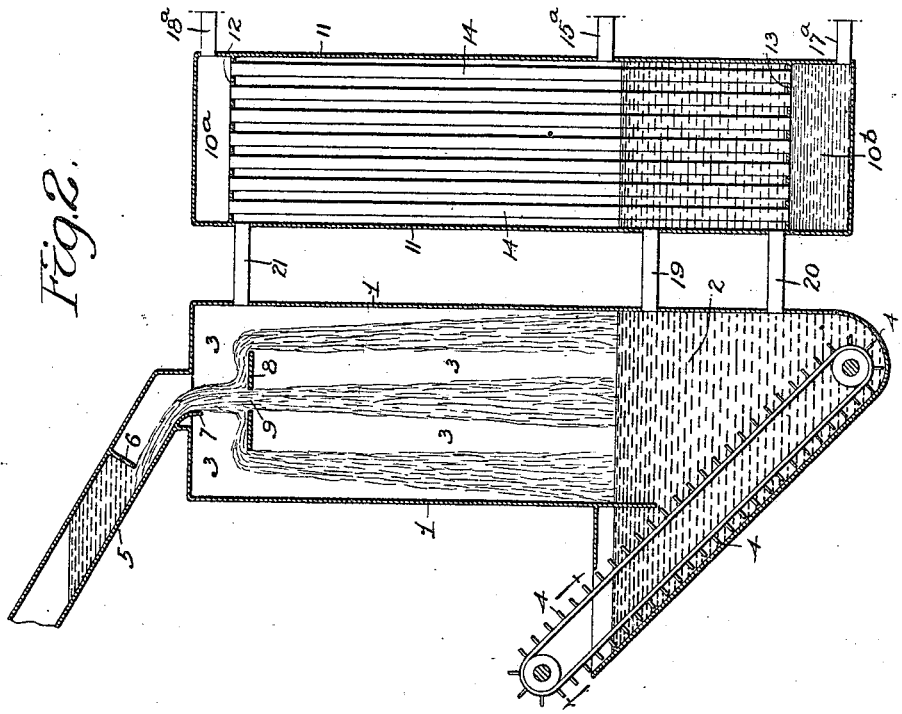
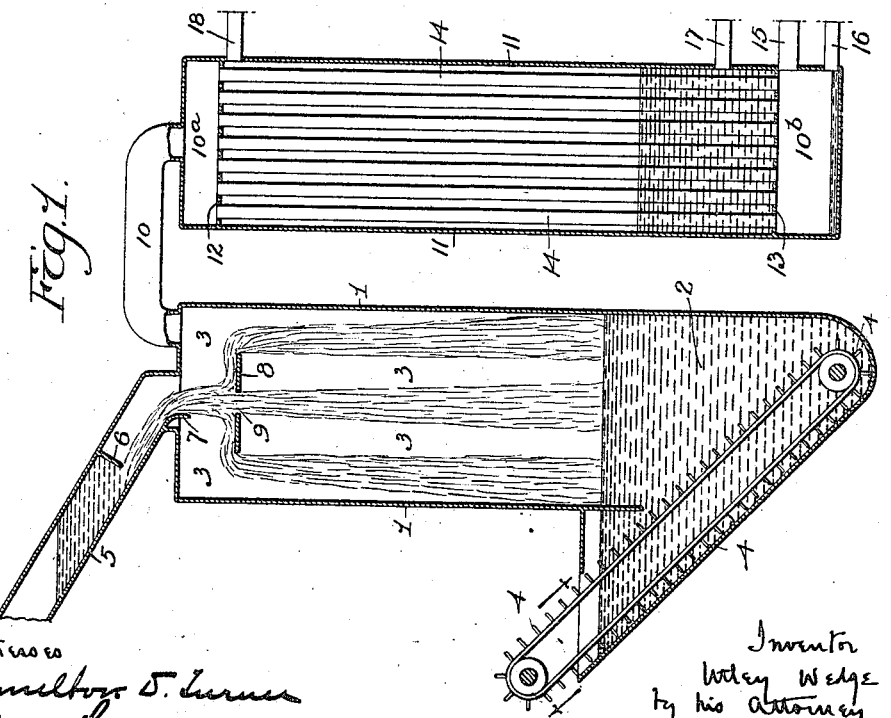

UNITED STATES PATENT OFFICE.

UTLEY WEDGE, OF ARDMORE, PENNSYLVANIA, ASSIGNOR, BY MESNE ASSIGNMENTS, TO FURNACE PATENT COMPANY, OF PHILADELPHIA, PENNSYLVANIA, A CORPORATION OF PENNSYLVANIA.

SLAG-HEATED STEAM-GENERATOR.

1,267,022.      Specification of Letters Patent.      Patented May 21, 1918.

Application filed July 16, 1914, Serial No. 851,332. Renewed April 27, 1916. Serial No. 94,054.

*To all whom it may concern:*

Be it known that I, UTLEY WEDGE, a citizen of the United States, residing in Ardmore, Montgomery county, Pennsylvania, have invented certain Improvements in Slag-Heated Steam-Generators, of which the following is a specification.

My invention relates to that type of steam generator in which the generation of steam is effected by dumping molten slag into a body of water. Steam generated in this manner is not always available for direct use in an engine, especially in an engine of the turbine type which is generally used, since the steam is likely to be associated with fixed gases which interfere with the proper operation of the engine or with acid vapors which corrode and finally destroy the working parts of the engine.

The object of my invention has therefore been to overcome these objections, and this object I attain by causing the steam generated from the body of water into which the slag is dumped to act as a heating agent for a secondary generator, the steam generated in the latter being used in the engine and the steam from the slag-heated generator, after having thus been used to heat the secondary generator, being, if desired, subsequently used for any purpose for which it is available.

By preference, the steam generated by dumping the molten slag into the water is superheated by contact with the inflowing molten slag. The slag-heated water may, if desired, be used to heat the secondary generator either instead of or in addition to the steam generated from such slag-heated water.

In the accompanying drawing—

Figure 1 represents a vertical longitudinal section of one type of apparatus designed for carrying out my invention, and Fig. 2 is a similar section of another type of apparatus in accordance with my invention.

In the drawing, 1 represents a shell or casing of any appropriate material containing a well 2 for containing the water which is to receive the molten slag and having a chamber 3 above said well for receiving the steam generated from the slag-heated water. One side of the bottom of the well 2 is inclined and adjacent to this side of the well is disposed an endless conveyer 4, the flights of the lower run of this conveyer operating in proximity to the inclined side of the well so as to raise from the latter the cooled slag which collects in the lower portion of the well, the choking of the well by the accumulation of slag therein being thereby prevented.

The flowing body of slag enters the vessel 1 from the inclined feed chute 5, which has a partial partition 6 for damming up the slag so as to cause it to act as a trap for preventing escape of steam outwardly through the feed chute, although any other available means for this purpose may be adopted. At the bottom of the feed chute 5 is a lip 7 over which the stream of molten slag flows and is delivered thereby onto a plate 8 in the upper portion of the chamber 3, which causes it to spread or splash and to descend in a number of relatively thin streams through the chamber 3 so that the steam arising from the body of water in the well 2 is caused to pass in intimate contact with the incoming streams of molten slag and is superheated thereby.

By preference the plate 8 has a central opening 9 so as to provide for a central descending stream of slag in addition to the streams which descend in that portion of the chamber 3 outside of the plate.

The superheated steam is conveyed from the chamber 3 by means of a pipe 10 into an upper chamber 10$^a$ of the secondary steam generator 11 which, in the present instance, is of the tubular type, having upper and lower plates 12 and 13 carrying tubes 14 through which the steam from the chamber 10$^a$ descends into a lower chamber 10$^b$ from which it escapes through a pipe 15 to be subsequently utilized in any desired manner, any water of condensation which may collect in the chamber 10$^b$ being withdrawn therefrom through a pipe 16.

Water is fed to the interior of the casing 11 by means of a pipe 17, surrounds the tubes 15 and is heated thereby, the steam rising from this body of water being further heated by contact with the upper portion of the tubes and finally escaping through the pipe 18 to the engine in which it is to be utilized as motive power.

In Fig. 2 I have illustrated apparatus in which both the slag-heated water and the steam generated therefrom are used for heating the secondary body of water. In this apparatus the lower portion of the vessel 11 is in communication with the well 2 by means of upper and lower pipes 19 and 20 so as to permit of the free circulation of the slag-heated water between the vessel 11 and the well, the steam chamber 3 being also connected by means of a pipe 21 with the space in said vessel above the level of water therein.

In this case the tubes 14 are heated by the hot water and steam surrounding the same and the secondary supply of water from which steam is to be generated is introduced into the chamber 10$^b$ at the bottom of the vessel 11 by means of a pipe 17$^a$, and rises to the desired height in the tubes 14, the steam generated from the secondary supply of water rising through the upper portions of the tubes 14 and being collected in the chamber 10$^a$ at the top of the vessel 11, from which it is conveyed through a pipe 18$^a$ to the engine in which it is to be utilized.

The steam from the chamber surrounding the upper portions of the tubes 14 may, after heating said tubes, be conveyed through a pipe 15$^a$ to any point where its further utilization is desirable.

The contact of the molten slag with the water in the well 2 serves to disrupt or granulate the mass as well as cool the same, the granulated slag being readily removed from the bottom of the well by means of the endless conveyer 4 so that it can be dumped at any convenient point outside of the well.

I claim:

1. The combination, in a slag heated steam generator, of a water container, means for discharging a stream of molten slag into the same, and a plate interposed in the path of said stream, said plate being located above the level of the water in the container, and presenting a flat upper surface of such width as to cause the initial stream of slag on striking said face to spread laterally and form a plurality of separated streams before it drops from the plate into the water.

2. The combination, in a slag heated steam generator, of a water container, means for discharging a stream of molten slag into the same, and a plate interposed in the path of said stream, said plate being located above the level of the water in the container and having a central opening therein through which part of the initial stream of slag can pass downwardly into the water, the plate being of such width as to cause lateral spreading of the remainder of the initial stream into a plurality of separated streams before it drops into the water.

3. The combination, in a slag heated steam generator, of a water container, means for discharging molten slag into the water for the purpose of generating steam therefrom, and a secondary steam generator having therein a body of water separate from the slag heated water, and means for causing said slag heated water to impart its heat to said separate water body.

4. The combination, in a slag heated steam generator, of a water container, means for discharging molten slag into the water for the purpose of generating steam therefrom, a secondary steam generator having therein a body of water separate from the slag heated water, and means for carrying the steam generated from the slag heated water first through the steam arising from said separate body of water and then through the water itself.

5. The combination, in a slag heated steam generator, of a water container, means for discharging molten slag into the water for the purpose of generating steam therefrom, a secondary steam generator having therein separated water chambers each with steam space above the water, means for supplying one of these water chambers with heated water derived from the slag steam generator, means for connecting the steam chamber of the slag steam generator with the steam space above said water body, means for supplying the other water chamber of the secondary steam generator with a body of water separate from the slag heated water, and means for causing the slag heated water in said secondary steam generator to heat said separate body of water therein.

In testimony whereof, I have signed my name to this specification, in the presence of two subscribing witnesses.

UTLEY WEDGE.

Witnesses:
KATE A. BEADLE,
HAMILTON D. TURNER.